April 12, 1960     A. N. WENNERSTROM     2,932,274
POINTER AND SCALE INDICATOR
Filed Aug. 13, 1958

INVENTOR.
ARTHUR N. WENNERSTROM
BY Hudson, Boughton,
Williams, Davids Hoffmann
ATTORNEYS

United States Patent Office 2,932,274
Patented Apr. 12, 1960

2,932,274

POINTER AND SCALE INDICATOR

Arthur N. Wennerstrom, Lyndhurst, Ohio, assignor to The National Screw & Manufacturing Company, Cleveland, Ohio, a corporation of Ohio Application August 13, 1958, Serial No. 754,883

1 Claim. (Cl. 116—124.1)

The present invention relates generally to indicators or indicator arrangements of the type employing a linear scale or dial having indicia thereon.

Many attempts have been heretofore made to secure a wire type indicator to a chain which is moved relative to a scale or like index at a predetermined rate. Many of these attempts, however, have proved unsuccessful for one reason or another. Soldering or welding of a wire type indicator to a chain, for example, is generally unsatisfactory due to the resulting damage to the chain, the prohibitive cost of such an operation and the overall unsatisfactory results obtained therefrom.

The principal object of this invention is to provide a novel and improved indicator means comprising a wire type indicator pointer carried by a ladder type sprocket chain which will overcome the objections to similar prior art devices.

Another object of the invention is to provide a novel and improved ladder type sprocket chain comprising a wire type indicator pointer, the base of which is connected to and forms a part of the chain.

A further object of this invention is to provide a ladder type sprocket chain having a simple and economical wire type pointer carried thereby for use in washing machines and other mechanisms which use a unidirectional pointer for indicating each stage of the operation being performed.

The foregoing and other objects and advantages of the invention will appear from the following disclosure and appended claim when considered in connection with the accompanying drawings which form a part of the specification and wherein like reference characters designate corresponding parts in several views.

Before explaining in detail the present invention, it is to be understood that the invention is not limited in its application to the details and arrangement of parts illustrated in the accompanying drawings, since the invention is capable of other embodiments and of being practiced or carried out in various ways. It is to be understood also that the phraseology or terminology employed herein is for the purpose of description and not of limitation, and that there is no intention thereby to limit the invention herein claimed beyond the requirements of the prior art.

Figure 1:
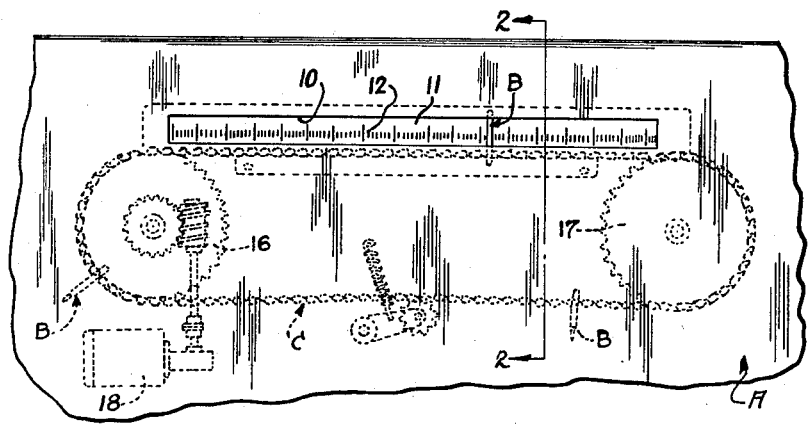
Fig. 1 is a fragmentary front elevational view of an appliance embodying the present invention.
Figure 2:
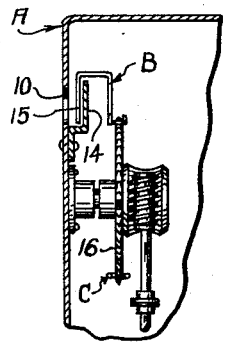
Fig. 2 is a fragmentary sectional view approximately on the line 2—2 of Fig. 1.
Figure 3:
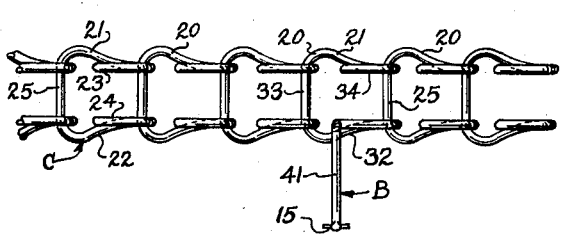
Fig. 3 is an enlarged plan view of the sprocket chain and indicator.
Figure 5:
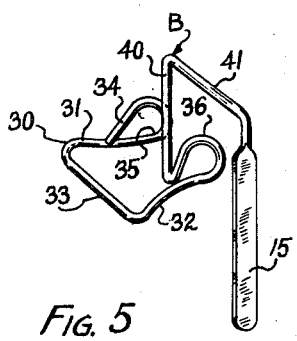
Fig. 5 is an enlarged perspective view of the indicator pointer.
Figure 4:
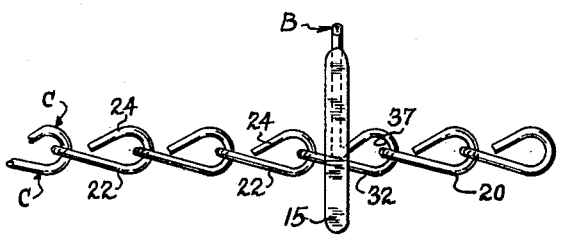
Fig. 4 is an enlarged front elevational view of the sprocket chain and indicator pointer.

Referring to the drawings, and particularly to Figs. 1 to 5, the invention is shown as embodied in a home appliance such as an automatic clothes washer having an enclosing housing A provided with an elongated slot 10 through which a linear scale or dial face 11 having indicia 12 thereon is visible and along which an indicator pointer B is adapted to travel and be automatically moved as the machine goes through the washing and drying cycles, etc. The linear scale or dial face 11 is formed along or by the front upper edge of a plate-like member 14 extending slightly beyond the ends of the slot 10 and having its lower edge connected to the enclosing housing A. The upper part of the member 14 is offset slightly to the rear of the housing A so that the free end 15 of the pointer B which is connected to and is carried by or forms a part of ladder type sprocket chain C in a manner hereinafter described, can move therealong without interference from the housing. The chain C is looped about two sprocket wheels 16, 17, rotatably supported on suitable shafts fixed in the housing A adjacent to but preferably spaced slightly beyond opposite ends of the member 14. One of the sprocket wheels, in the present instance the wheel 16, is driven in a predetermined manner in accordance with the cycle of operation of the machine by a unidirectional motor 18. It is, however, to be understood that either or both of the sprocket wheels 16, 17, may be driven in any suitable manner.

The ladder type sprocket chain C consists of a plurality of generally horseshoe-shaped links 20 having generally parallel extending arms 21, 22 having their ends 23, 24 bent back upon themselves in a 180° angle to extend in a general direction of the train of chain links 20. Each pair of parallel arms 21, 22 are bent about the base or transverse portion 25 of an adjoining horseshoe-shaped link 20 so that a continuous chain is developed with the transverse portion 25 of one link extending through the eyes of an adjoining link formed by the ends 23, 24 of the arms 21, 22.

The indicator pointer B as shown is formed of a single length of wire and comprises a horseshoe or U-shaped base 30 similar to one of the links of the chain C and comprising two generally parallel side members or arms 31, 32 connected by a transverse portion 33. The free end 34 of the side member or arm 30, which end is relatively short, is bent back upon itself 180° and forms a loop 35 about the cross or transverse portion 25 of the link 20 immediately to the right thereof. The other arm 32 has a portion 36 bent back upon itself to form a return bend 37 which loops about the transverse portion 22 of the same link 20 of the chain as that about which the end 34 of the arm 31 is bent. From the end of the loop 36, the wire or pointer has a portion 40 extending upwardly in a direction normal to the plane of the base 20 a distance sufficient to clear the top of the member 14 where it is bent at right angles in a direction normal to the plane of the chain C to form a portion 41 and then back upon itself in front of the member 14 to form the portion or pointer proper 15.

The construction provides aa U-shaped portion comprising the legs 15, 40 connected by a member or base 41 and which U-shaped portion is positioned normal to the plane of the base 30 and offset forwardly therefrom. The U-shaped portion is inverted in the embodiment shown and engages over the upper edge of the metal member 14 but which may ride thereupon if desired. The front arm 15 of the U-shaped portion of the pointer is flattened as shown and acts as the pointer proper. The ends 23, 24 of the link 20 immediately to the left of the pointer loop about the cross member 23. The construction is such that the base 30 of the pointer B connects, or forms the connection therebetween, the two adjoining portions of the chain C.

The indicator pointer B can be easily inserted in the chain C by opening the loops 35, 37 a small amount and first threading the pointer through adjoining right-hand end of the chain until the cross member 25 is in or adjacent to the loop 37. Thereafter, the cross member 25 can be inserted in the loop 35 and the loop closed to retain the cross member 25. With the ends 23, 24 of parallel arms of the link 20 of the chain immediately to the left of the indicator open sufficiently to permit the cross member 33 of the indicator to be inserted therein, this can be readily accomplished. The loops are then closed.

The present invention contemplates a construction wherein the indicator pointer may travel continuously in the same direction. The sprocket chain C and the pointer B are, therefore, so connected as not to interfere with the passage of the sprocket chain of which the pointer is a part about the sprocket wheels. In the embodiment shown, the length of the chain C is three times that of the scale or indicia 12 and three indicator pointers are employed equally spaced about the chain with the result that as one indicator leaves the scale, another enters the other end of the scale. It is, however, to be understood that one or more indicators may be used as desired.

The indicator shown is made of wire bent in the manner described but it is to be understood that other material may be employed. For example, the indicator may be made of thermosetting plastic in which event it would preferably be made with the loops 35, 37 slightly open.

While the preferred embodiment of the invention has been shown and described in considerable detail, it is to be understood that the invention is not limited to the embodiment shown, but is susceptible of many changes and modifications, and it is the intention to cover hereby all such changes and modifications which come within the scope of the appended claim.

Having thus described my invention, what I claim is:

In a device of the character described, a dial face having indicia thereon, rotatable sprocket wheel means located adjacent to said dial face, a ladder type chain encircling said sprocket wheel means and comprising a plurality of U-shaped links connected in series, said U-shaped links each having generally parallel arms connected by a base member, said arms having eyelets in the free ends thereof encircling the base of the adjoining link, and a pointer formed integral with the end of one of said eyelets and movable along said dial face upon rotation of said sprocket wheel means.

References Cited in the file of this patent

UNITED STATES PATENTS

| | | |
|---|---|---|
| 2,521,564 | Bernard | Sept. 5, 1950 |
| 2,549,655 | Woodward | Apr. 17, 1951 |
| 2,696,190 | Blum | Dec. 7, 1954 |